Sept. 15, 1953           G. M. GRAHAM           2,651,887
PROCESS OF AND APPARATUS FOR REMOVING CARBON FROM
THE INTERIOR WALLS OF COMBUSTION CHAMBERS
Filed Oct. 18, 1950                                2 Sheets-Sheet 1
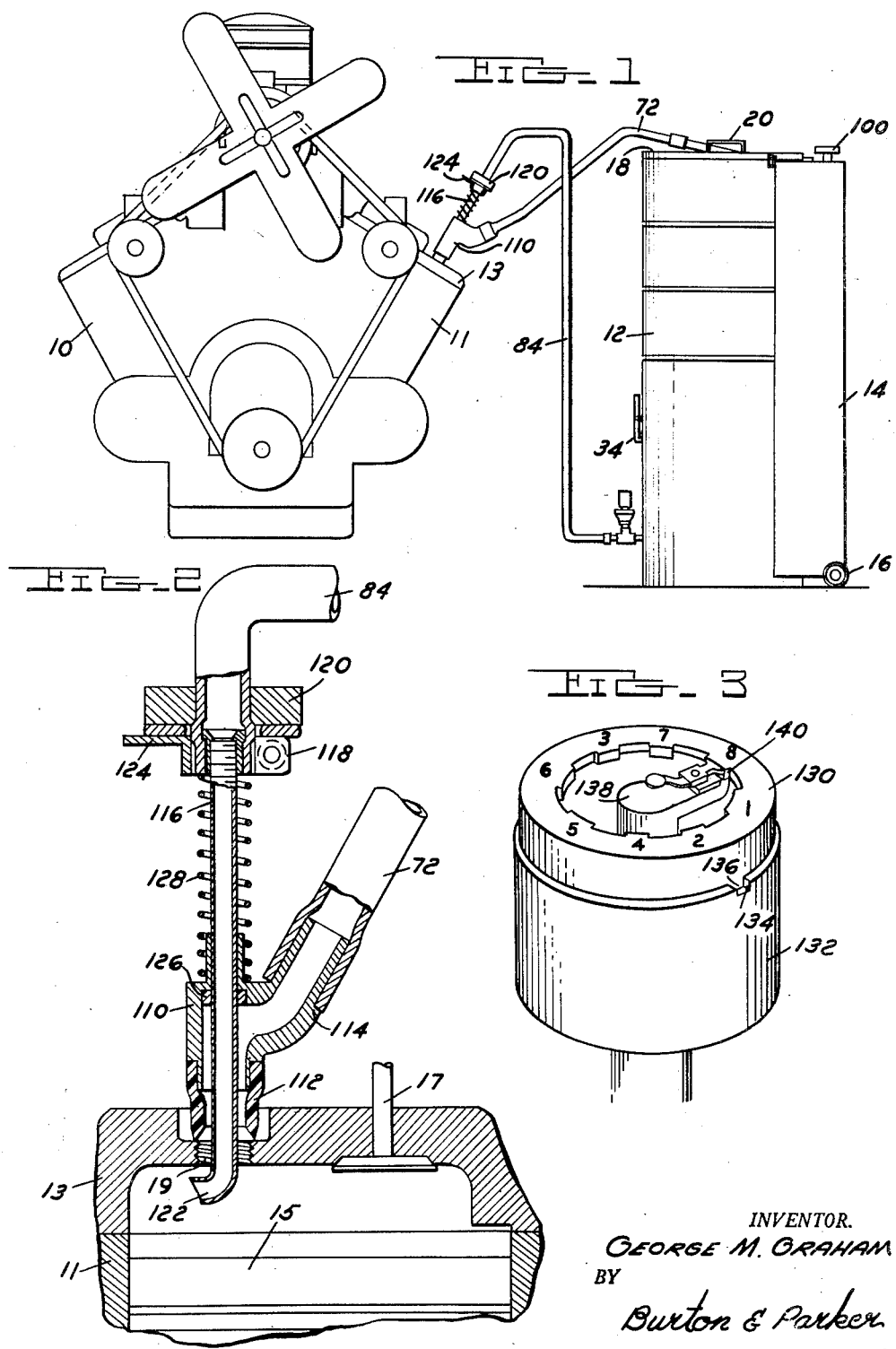
INVENTOR.
GEORGE M. GRAHAM
BY
Burton & Parker
ATTORNEYS

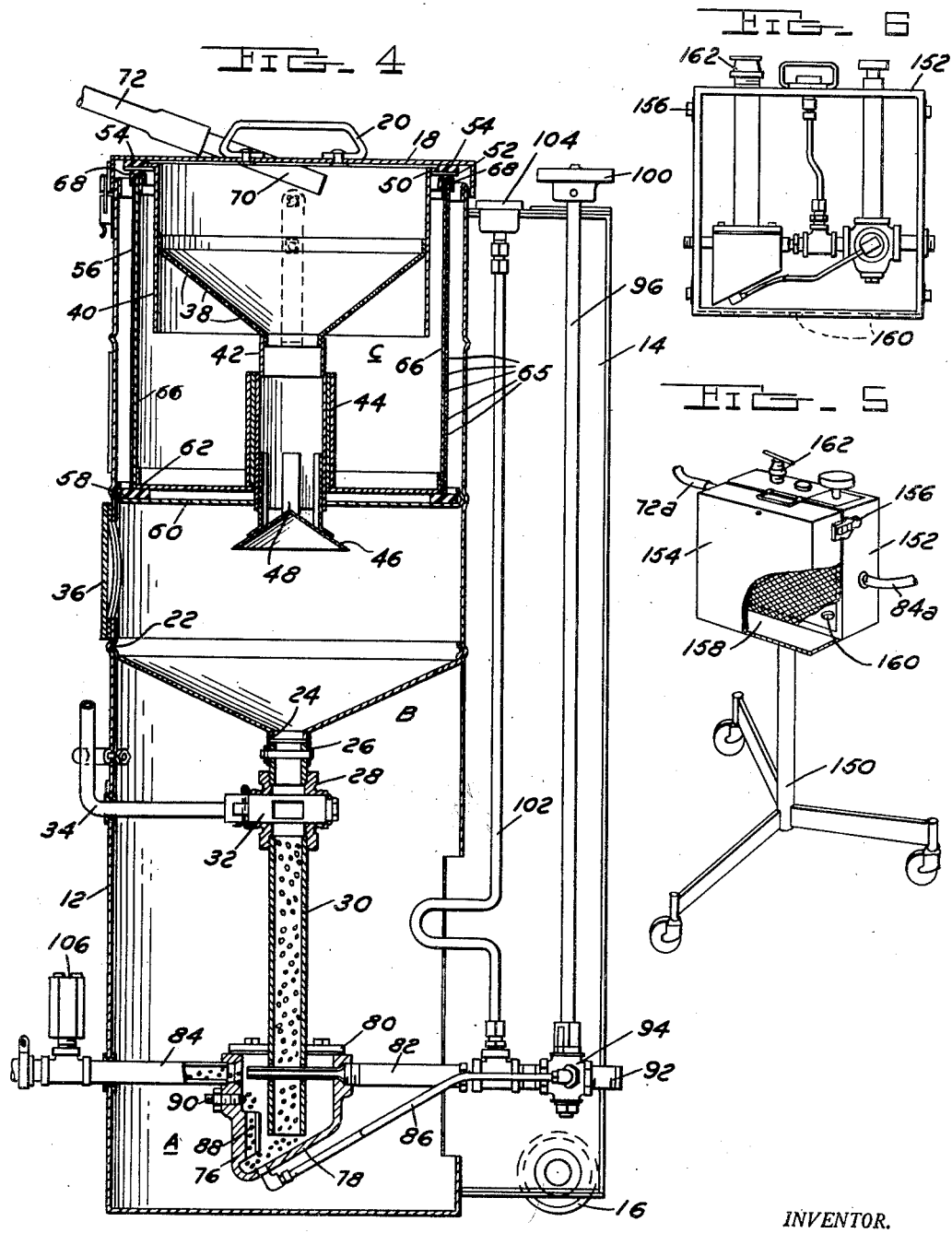

Patented Sept. 15, 1953

2,651,887

UNITED STATES PATENT OFFICE 2,651,887

PROCESS OF AND APPARATUS FOR REMOVING CARBON FROM THE INTERIOR WALLS OF COMBUSTION CHAMBERS

George M. Graham, Fort Lauderdale, Fla., assignor to Kent-Moore Organization, Inc., Detroit, Mich., a corporation of Michigan Application October 18, 1950, Serial No. 190,828

19 Claims. (Cl. 51—8)

This invention relates to an improved process of and apparatus for removing carbon particles from the head and adjacent inner wall surfaces of an internal combustion engine cylinder.

This application is a continuation-in-part of my application Serial No. 144,334, filed February 15, 1950, and now abandoned.

In internal combustion engines there is a tendency for carbon deposit to form on the inner wall surfaces. This tendency is increased in the high compression engines. Such carbon particles tend to produce preignition or what is commonly termed "knock." Under slow driving such carbon deposits may form in a relatively short time. To remove the cylinder head and clean off the carbon requires considerable time. Burning off the carbon with a gas fire blast without removing the head has not proven very satisfactory.

This invention relates to an improved method of and means for removing such carbon deposits without taking off the cylinder head. Removal is accomplished by blasting the inner surface of the head and adjacent inner wall surface of the cylinder with hard granules of combustible material, such as rice grains. It has been found that by blasting these hard granules of organic material against the inner surface of a cylinder head and the inner surface of the cylinder wall adjacent thereto the carbon particles are dislodged from the blasted surface. This blast of granules may be directed against the head of the cylinder from the nozzle of air blast mechanism which nozzle may be introduced into the cylinder through a spark plug opening or other aperture.

The air blast nozzle assembly comprises a granule ejector nozzle portion and a granule return nozzle portion. The air blast which projects the granules against the inner surface of the combustion chamber also serves to scavenge dislodged carbon particles and used granules out of the combustion chamber through the escape portion of the nozzle assembly. The air blast may be continued following the projection of the full quantity of granules selected for a single blasting operation in order to complete the scavenging of used granules and dislodged carbon particles from the interior of the chamber.

Should all of the blast granules not be removed during the blasting operation no damage will be done to the engine for the reason that the granules that remain in the combustion chamber being combustible will be burned in the operation of the engine. Following the blasting operation the spark plug is placed back in the spark plug opening and the engine is run under its own power. The combustion which occurs in the combustion chamber burns up any blast granules which were not scavenged from the combustion chamber during the blasting.

This process is relatively simple and easy to carry out at small cost of time and material. The process does not require any disassembly of the engine beyond the removal of the spark plug. The process may be so carried out that the granules which are not damaged may be recovered and reused. The process may be carried out as a continuous one. The mixture of carbon particles and used granules scavenged from the cylinder may be separated during the carrying out of the process and the granules suitable for reuse may be returned to the delivery line for reuse.

The apparatus includes a container for blast granules, a chamber communicating with the container to receive blast granules therefrom, air blast mechanism adapted to pick up the granules from such chamber, a granule delivery line provided with a nozzle assembly whereby a blast of granules may be projected therethrough and through an opening in the wall of a combustion cylinder and directed against the inner surface of such wall, and used granules and dislodged carbon particles may be scavenged out of the combustion chamber during the blasting operation. Granules of the hardness of short grain rice have been found satisfactory.

Blast granules are projected through the ejector line against the inner surface of the cylinder wall at the same time that used granules and dislodged carbon particles are scavenged out of the cylinder through the return line. The ejector part of the blast nozzle is manipulable to project the blast granules against any part of the inner surface of the combustion chamber.

Other objects and meritorious features will more fully appear from the following description, claims and accompanying drawings wherein:

Fig. 1 is a schematic illustration of an internal combustion engine and mechanism for carrying out the improved process of this invention;

Fig. 2 is a sectional view through the head of a combustion engine showing the blast nozzle assembly in connection therewith;

Fig. 3 is a perspective of the valve positioning indicator mechanism of the apparatus;

Fig. 4 is a vertical sectional view through an embodiment of the apparatus shown in Fig. 1;

Fig. 5 is a perspective of a modified form of apparatus;

Fig. 6 is an enlarged vertical sectional view of the structure without the supporting stand shown in Fig. 5.

This application is a continuation in part of U. S. application Serial No. 144,334, filed February 15, 1950, of this applicant.

Fig. 1 illustrates schematically the carrying out of the process of this invention. In such figure a conventional internal combustion engine is indicated by the numeral 10. The apparatus provided for the carrying out of the process is shown as connected up with one of the cylinders of such engine through a spark plug opening from which the spark plug has been removed. Generally the apparatus includes an upright cylindrical casing 12 having an upright smaller secondary casing 14 secured thereto. Wheels 16 are provided for movement of the apparatus. Casing 12 has a removable lid 18 provided with a handle 20. Casing 12 and subsidiary casing 14 serves as an enclosure for the apparatus. Within the lower portion of casing 12 there is disposed a granule discharge chamber assembly A. Within an intermediate portion of casing 12 is mounted an intermediate hopper assembly B. Within the upper portion of casing 12 is disposed an upper hopper assembly C.

The intermediate hopper assembly B is a funnel-shaped hopper having a side wall portion 22 shaped to interlock with a correspondingly shaped portion of the casing 12, as shown in Fig. 4. This hopper terminates in an outlet 24 which is telescoped within a pipe 26 which pipe 26 communicates with a valve 28. The valve 28 communicates with and surmounts a stand pipe 30. This stand pipe communicates with and extends into the granule discharge chamber assembly A. The discharge of granules from the hopper B into the stand pipe 30 is controlled by manipulation of a plug valve 32. This valve is provided with a handle 34. The intermediate chamber comprises not only the hopper assembly B but the casing wall which surmounts this hopper assembly. A window 36 is provided whereby the interior of the intermediate hopper is open to inspection.

The intermediate hopper is surmounted by the upper hopper assembly C which comprises a funnel-shaped foraminous element 38, the upper portion of which is surrounded by a cylindrical shell 40 and the lower portion 42 of which telescopes into the upper end of the tubular section 44 to discharge thereinto. Below the lower end of this tubular section 44 is disposed a baffle 46. This baffle has fingers 48 mounted within the tube 44 and spaced apart so that granules discharging from the element 38 through the section 44 pass out between the fingers 48 and are spread out by the baffle element 46 over the bottom of the intermediate hopper.

The upper margin of the shell 40 has a flange 50 which overhangs and is supported upon a supporting ring 52. A packing ring 54 is interposed between the supporting ring 52 and the cover 18 to form an air-tight seal. Ring 52 rests upon the upper margin of a cylindrical container 56 which container is itself supported upon a packing ring 58 carried by a supporting ring 60, which ring 60 is shaped to interlock with a corresponding part of the casing wall 12 to be supported thereby as shown in Fig. 4. The cylindrical container 56 has a bottom portion 62. The wall of this container is of a screen-like nature, as indicated at 65. A filter cloth 66 is extended over this screen-like wall. The upper margin of the cylindrical container wall is provided with a gasket 68.

This upper hopper assembly C is adapted to receive used blast granules and dislodged carbon particles resulting from the blasting operation, which mixture is directed into the hopper from the tubular outlet element 70 which is carried by the flexible return line 72 from the blast nozzle assembly. The mixture entering the upper hopper assembly is directed against the cylindrical wall thereof and the dust and fine particles pass on through the screen-like funnel element 38 and are collected within the cylindrical container 56. The air passes through the filter wall of this container and such air escapes over the top of the container wall underneath the cover 18. The cover 18 does not form a tight seal with the wall of the casing but is intended to form a tight seal with the wall of the container 56.

The granule discharge receptacle assembly A located in the bottom of the casing comprises a chamber 76 which has a sloping bottom 78 and a cover 80. An air jet tube 82 extends into the interior of this chamber through its wall and extends through the stand pipe 30 toward an outlet tube 84 which communicates with the interior of the chamber through the wall, as shown in Fig. 4. A second jet tube 86 communicates with the interior of the chamber through the sloping bottom thereof.

The chamber itself exhibits an upright passageway portion 88. The upper end of this passageway may be obstructed by an adjustable pin 90. This pin may be projected into the chamber to obstruct the discharge of granules through the passageway 88 or it may be withdrawn so as not to obstruct such passageway so as to exercise control over the quantity of granules blown upwardly through such passageway toward the outlet tube 84.

Jets 82 and 86 are fed with air by an air pipe 92 from a suitable source of compressed air, not shown. Flow of air from pipe 92 is regulated by valve mechanism 94 having a stem 96 provided with a handle 100. The valve is a conventional three-way valve which may be positioned to obstruct entirely the flow of air from the pipe 92 to either of the jets 82 or 86 to permit flow of air through both jets 82 and 86 simultaneously, or to permit flow of air through jet 82. The valve is marked to indicate "Blast," "Clean," and "Off."

102 indicates a pressure gauge mechanism which has an indicator portion 104 whereby the air pressure within the conduit may be made known to the operator of the machine.

106 indicates relief valve mechanism mounted on the discharge conduit 84 which mechanism is adapted to release the pressure of the conduit if it builds up to the danger point because of clogging of the discharge nozzle. Conduit 84 leads to a nozzle assembly, as shown in Figs. 1 and 2. The conduit 72 is a return conduit leading from such discharge nozzle assembly back into the container.

In Fig. 2 a chamber 11 of the internal combustion engine 10 is provided with head portion 13. A piston 15 is reciprocably mounted within the cylinder. The head is provided with a valve opening controlled by a valve 17 and as spark plug opening indicated as 19. In Fig. 2 this spark plug is shown as removed from its opening, the valve is shown as closed and the piston is shown as moved slightly below its uppermost position.

The nozzle assembly (Fig. 2) comprises a shell 110 which terminates in an end fitting 112 which fitting may be formed of a suitable deformable plastic, as for example, synthetic rubber, such as neoprene. This fitting has a beveled end. The shell has an angular outlet portion 114 with which the return tube 72 is connected. The discharge tube 84 terminates in a discharge nozzle jet 116. This nozzle jet is coupled to the flexible tube 84 by clamping means 118. A cushion ring 120 extends about the tube 84.

This nozzle jet 116 has an angular end portion 122 and the clamping means 118 has a pointer portion 124 which extends in the same direction as the angular end 122 to indcate to the operator the position of angularity of the end 122. The nozzle jet 116 extends slidably and rotatably through the shell 114 and through a packing washer 126 mounted within the shell 114. A spring 128 is interposed between the shell 114 and the clamp 118 to normally hold the nozzle jet upwardly with respect to the shell 110 except when pressure is imposed upon the cushion ring 120 to push the nozzle jet down beyond the end fitting 112 against the tension of the spring 128.

The apparatus includes a valve position indicator ring 130 seated upon the bottom portion of the engine distributor casing 132. Such bottom portion of the casing is provided with a notch 134 and the distributor cap is provided with a lug which normally seats within the notch 134 to position the cap on the bottom. The ring is provided with a lug 136 adapted to be received within the notch, upon removal of the cap, to position the ring thereon. The ring is provided with numerals reading from 1 to whatever number of cylinders this engine is provided with, as for example 8. The rotor 138 of the distributor rotates within the ring. When the shoe 140 of the rotor engages the contact lug indicated by the numeral 8 this indicates that the valve in number 8 cylinder is closed and the piston is in the "proper position." Such "proper position" is slightly below the top of the piston stroke. The purpose of this mechanism is to indicate to the operator the position of the piston and valve in a cylinder.

In carrying out the process with the apparatus shown, the spark plug is removed from the cylinder to be treated and the crank of the engine is turned over until the piston is in the "proper position" and the valves are closed. The nozzle assembly tip 112 is placed against the bottom of the spark plug counter-bore surrounding the spark plug opening establishing communication with the interior of the cylinder. The ejector jet 116 is projected through the spark plug opening against the resistance of the spring 128 until the angular end portion 122 can be hooked over the edge of such opening. The spring 128 exerts a pressure to hold such angular end up against the head of the cylinder. This ejector nozzle may then be moved downwardly against the piston so as to determine the piston's spacing below the head of the cylinder. The valve position indicator is so constructed that the "proper position" is that indicated when the rotor registers with a cylinder number at which point the piston is slightly below the top of its stroke.

The valve 34 which controls the flow of granules from the intermediate hopper assembly B is rotated to fill the stand pipe 30 with the required quantity of granules for a single blasting operation. When the stand pipe is filled the valve is closed. The air is then turned on and a jet of air from the jet 86 projects granules from the bottom of the chamber 78 up through the passageway 88 to a position in front of jet 82. The blast of air through the jet 82 directs such granules through tube 84 and through the ejector 116 into the interior of the cylinder. This ejector jet 116 is then rotated to blast the entire side surface of the combustion chamber above the piston. It is then tilted and rotated to blast either the top of the piston or the head of the cylinder and thereafter tilted and rotated to blast the remaining wall portion. Tilting is accomplished against the yielding deformation of end fitting 112. End fitting 112 because of its knife edge forms a good seal with the head of the combustion chamber and such bevel also facilitates tilting thereof.

The granules which are ejected from the angular outlet 122 of the jet 116 blast the surface of the combustion chamber removing carbon deposits therefrom. The used granules and dislodged carbon are blown out of the combustion chamber through the end fitting 112 about the jet 116 through the outlet 114 and the tube 72 and returned to the upper hopper assembly C. Broken granules and dislodged carbon are collected in the cylindrical container 56. The granules which are unbroken and satisfactory for reuse flow down into the intermediate hopper B.

In one commercial use of the machine it has been found that five and one-half ounces of short grain hard rice granules have proven sufficient for a satisfactory blasting of one cylinder of an internal combustion engine. Other combustible granules of the hardness of short grain rice are satisfactory. In the carrying out of this blasting operation both air jets were allowed to run for four and one-half minutes. Then the lower jet was shut off and the upper jet was run alone so as to scavenge used granules and dislodged carbon from the combustion chamber. Running for a total period of five minutes (one-half minute on the upper jet), it was found that substantially all of the used blast granules were removed from the combustion chamber.

Should it turn out that not all of the used granules are scavenged out during the blasting operation no harm will be done to the engine because when the apparatus is disconnected and the spark plug is replaced and the engine is operated under its own power any unused granules remaining in the combustion chamber will be consumed or blown out through the exhaust valve opening.

The apparatus shown in Figs. 5 and 6 represents a modified construction of small size. A box-like casing is supported upon a portable stand 150. Within portion 152 of the casing the granule chamber assembly A is located, as shown in Fig. 6. The other portion 154 of the casing is adapted to be detachably connected with the first portion by conventional connecting means 156. The portion 154 forms a collector box for used granules and is separated from portion 152 by a screen 158. 84-a represents the discharge tube that corresponds to the discharge tube 84 of the apparatus shown in Fig. 1 and 72-a represents the return tube that corresponds to the return conduit 72 shown in Fig. 1. The aperture 160 represents an outlet from the casing for dust and broken granules. The stand pipe of the granule chamber is closed by a cap 162 which may be removed to fill the stand pipe with a charge of granules. This particular modification differs from the large size unit heretofore described only in that it is designed to receive merely a single charge of granules. The functioning is the same.

What I claim is:

1. Apparatus for removing carbon particles from the head of a cylinder of an internal combustion engine, which cylinder is provided with an opening through its wall comprising, in combination, a granule discharge chamber, a granule delivery line leading from the chamber and terminating in a discharge nozzle receivable through the cylinder wall opening, a granule return line provided with a resistingly deformable tubular end fitting surrounding in spaced relation the discharge nozzle and adapted to communicate with the cylinder wall opening, said discharge nozzle being supported for rotatable and axial slidable movement within the end fitting and spring means exerting axial pressure on the discharge nozzle relative to the end fitting, and air blast mechanism adapted to project granules from the discharge chamber through the delivery line leading therefrom and through the discharge nozzle.

2. Apparatus for removing carbon particles from the head of a cylinder of an internal combustion engine, which cylinder is provided with an opening through its wall comprising, in combination, a granule discharge chamber, a granule delivery line leading from the chamber and terminating in a discharge nozzle receivable through the cylinder wall opening, a granule return line provided with a resistingly deformable tubular end fitting surrounding in spaced relation the discharge nozzle and adapted to communicate with the cylinder wall opening, said discharge nozzle being axially slidably received through said fitting and rotatable therein, air blast mechanism adapted to project granules from the discharge chamber through the delivery line leading therefrom and through the discharge nozzle, said discharge nozzle being manipulable within the opening to direct granules against the inner surface of the cylinder wall and to project used granules and dislodged carbon out of the cylinder wall through the granule return line.

3. Apparatus for removing carbon from the head of a cylinder of an internal combustion engine having a spark plug opening comprising, in combination, a granule discharge chamber, a granule discharge line leading therefrom and terminating in a discharge nozzle receivable through the spark plug opening, a granule return line provided with an end fitting surrounding in spaced relation the discharge nozzle and adapted to communicate with the spark plug opening, air blast mechanism provided with two air jets disposed within the chamber, one jet directed toward and spaced from the discharge line opening, the other jet disposed to project granules upwardly from the floor of the chamber into the space between the first jet and the discharge line opening.

4. Apparatus for removing carbon from the head of a cylinder of an internal combustion engine comprising, in combination, a granule discharge chamber, a granule containing stand pipe leading into the chamber adapted to contain granules and deliver the same into the chamber, a granule discharge line leading from the chamber and terminating in a discharge nozzle, air blast mechanism provided with two air jets within the chamber, means controlling the flow of air through each of said jets, one air jet directed axially toward the discharge line opening, the other air jet disposed to project granules upwardly from the floor of the chamber into the space in front of the discharge line opening, and means within the chamber adapted to direct granules projected by said second jet to be acted upon by the blast from the first jet.

5. Apparatus for removing carbon from the head of a cylinder of an internal combustion engine comprising, in combination, a granule discharge chamber, a granule discharge line leading therefrom and terminating in a discharge nozzle, a granule return line provided with a tubular end fitting surrounding in spaced relation the discharge nozzle, air blast mechanism provided with two air jets disposed within the chamber, one projecting thereinto directly axially toward the opening into the discharge line, the second jet projecting through the bottom of the chamber, and a granule guide within the chamber disposed to direct granules projected by the second jet toward the opening into the discharge line.

6. Apparatus for removing carbon from the head of a cylinder of an internal combustion engine comprising, in combination, a granule discharge chamber, a granule discharge line leading therefrom and terminating in a discharge nozzle, a granule return line provided with a tubular end fitting surrounding in spaced relation the discharge nozzle, said return line communicating with the chamber to deliver granules thereinto, said chamber having a bottom sloping toward a point disposed below the chamber opening into the discharge line, air blast mechanism provided with two air jets disposed within the chamber, one jet disposed to direct an air blast toward the chamber opening of the discharge line, the other jet disposed to project granules upwardly from the bottom of the chamber into the space between the first jet and opening into the discharge line.

7. Apparatus for removing carbon from the head of an internal combustion engine cylinder comprising, in combination, a granule container, a granule discharge chamber, a granule delivery line leading from the container into the discharge chamber, means controlling the flow of granules through said line, a granule discharge line leading from the chamber and terminating in a discharge nozzle, a granule return line provided with a tubular end fitting surrounding in spaced relation the discharge nozzle, said fitting having a tubular outer end portion of resilient deformable air impervious material beveled to a yielding outer edge, said return line communicating with the container through filter mechanism, air blast mechanism communicating with the discharge chamber adapted to direct a blast of air to project granules from the chamber through the granule discharge line.

8. Apparatus for removing carbon particles from the head of a cylinder of an internal combustion engine, which cylinder is provided with an opening through its wall comprising, in combination, a granule container, a granule discharge chamber, a granule delivery line leading from the chamber and terminating in a discharge nozzle receivable through the cylinder wall opening, air blast mechanism adapted to direct an air blast against the granules in the discharge chamber to project a blast of granules through the delivery line discharge nozzle and direct the same against the head of the cylinder, a granule return line leading into the granule container and provided with a tubular end fitting surrounding in spaced relation the discharge nozzle, said tubular end fitting having a resistingly deformable substantially air impervious end portion adapted to form a tight seal about the cylinder wall opening, said discharge nozzle being supported within the tubular end fitting for rotatable movement and axially slidable movement beyond and toward the end fitting.

9. Apparatus for removing carbon from the head of an internal combustion engine cylinder comprising, in combination, a granule container, a granule discharge chamber, a granule delivery line leading from the container into the discharge chamber, means controlling the flow of granules through said line, a granule discharge line leading from the chamber and terminating in a discharge nozzle, a granule return line provided with an end fitting surrounding in spaced relation the discharge nozzle, said return line communicating with the container through filter mechanism, air blast mechanism communicating with the discharge chamber adapted to direct a blast of air to project granules from the chamber through the granule discharge line, said filter mechanism provided with means adapted to separate unbroken granules from solid particles of smaller size and also provided with filter means adapted to permit escape of gaseous products delivered by the return line with the solid particles.

10. That process of removing carbon particles from the head of a cylinder of an internal combustion engine, which cylinder is provided with a spark plug opening, comprising projecting hard combustible granules from a granule container through a discharge nozzle inserted into the cylinder through the spark plug opening directing said projected granules against the head of the cylinder to dislodge carbon particles therefrom, continuing such projecting to carry the mixture of used granules and dislodged carbon particles out of the cylinder through said spark plug opening outside of said nozzle, separating selected granules from the mixture withdrawn from the cylinder, and returning said selected granules to the container all as a continuous process.

11. Apparatus for removing carbon particles from the head of a cylinder of an internal combustion engine, which cylinder is provided with an opening through the wall thereof, comprising, in combination, a granule discharge receptacle, a granule delivery line leading therefrom and terminating in a discharge nozzle receivable through the cylinder wall opening, a granule container communicating with the discharge receptacle through a valve controlled passageway, air blast mechanism adapted to direct a blast of air against the granules within the receptacle to project a stream of granules therefrom through the granule deliver line nozzle to be directed against the head of the cylinder, and a granule return line leading into the granule container terminating at its outer end in a fitting adapted to register with the opening in the wall of the cylinder surrounding the granule discharge nozzle, said granule discharge nozzle being rotatable relative to said fitting and having a discharge end extending beyond the end of the fitting and projecting angularly with respect thereto.

12. Apparatus for removing carbon particles from the head of a cylinder of an internal combustion engine, which cylinder is provided with an opening through the wall thereof comprising, in combination, a granule discharge receptacle, a granule delivery line leading therefrom and terminating in a discharge nozzle receivable through the cylinder wall opening, a granule container provided with a valve controlled delivery outlet leading to the granule discharge receptacle, a granule receiving foraminous hopper surmounting the container and communicating therewith to deliver granules thereto, air blast mechanism adapted to direct a blast of air against the granules within the receptacle to project a stream of granules therefrom through the granule delivery line nozzle to be directed against the head of the cylinder, and a granule return line leading into the hopper and provided therein with a discharge nozzle adapted to direct the granules about the foraminous wall of the hopper, said return line provided at its outer end with an intake fitting surrounding the discharge nozzle of the granule delivery line and adapted to be placed in communication with the opening in the wall of the cylinder, said discharge nozzle being rotatable within and relative to said fitting and having a discharge end extending beyond the end of the fitting and bent to project radially with respect to the fitting and to overhang the end of the fitting.

13. Apparatus for removing carbon particles from the head of a cylinder of an internal combustion engine which cylinder is provided with an opening through the wall thereof, comprising, in combination, a granule discharge receptacle provided with a sloping bottom wall, a granule delivery line leading from a point spaced above said sloping bottom wall and terminating in a discharge nozzle receivable through the opening in the wall of the cylinder, a granule container provided with a valve controlled discharge outlet terminating in a pipe discharging into the receptacle spaced above the sloping bottom wall thereof, a granule receiving foraminous hopper surmounting the container and communicating therewith to deliver granules thereto, air blast mechanism provided with two outlets terminating within the granule discharge receptacle, one outlet terminating adjacent to the sloping bottom of the receptacle to direct a blast of air to project granules upwardly therefrom and the other outlet disposed to direct a blast of air toward the communication of the granule delivery line with the receptacle, and a granule return line leading into the hopper and provided therein with a discharge nozzle adapted to direct granules about the foraminous wall of the hopper, said return line provided at its outer end with an intake fitting surrounding the discharge nozzle of the granule delivery line and receivable within the opening in the wall of the cylinder.

14. Apparatus for removing carbon particles from the head of a cylinder of an internal combustion engine provided with a spark plug opening, comprising, in combination, a granule container, a granule delivery line leading from the container and terminating in a discharge nozzle receivable through the spark plug opening, a used granule return line communicating with the container and provided with an end fitting having a resilient tip portion adapted to seat against the cylinder surrounding the spark plug opening and communicating therewith, said discharge nozzle rotatably supported within the end fitting for rotation relative thereto and projecting beyond the end of the fitting and bent angularly at its outer end to overhang the end of said fitting.

15. Apparatus for removing carbon particles from the head of a cylinder of an internal combustion engine provided with a spark plug opening comprising, in combination, a granule discharge receptacle, a granule delivery line leading from the receptacle and terminating in a discharge nozzle receivable through the spark plug opening, air blast mechanism provided with two outlets terminating within the discharge receptacle, one outlet disposed to direct a blast of air against the granules within the receptacle, the other outlet disposed to direct a blast of air toward the delivery line opening into the receptacle, a used granule return line provided at its outer end with an intake fitting surrounding the discharge nozzle of the delivery line and adapted to seat against the cylinder wall about the spark plug opening communicating therewith, said discharge nozzle of the delivery line projecting beyond said fitting and being rotatable with respect thereto.

16. Apparatus for removing carbon particles from the head of a cylinder of an internal combustion engine, which cylinder is provided with an opening through its wall comprising, in combination, a granule receptacle, a granule discharge line leading from the receptacle and terminating in a discharge nozzle receivable through the cylinder wall opening, a granule return line communicating with the receptacle and provided with a tubular fitting at its outer end adapted to communicate with the cylinder wall opening, said fitting having a resilient tip portion, the discharge nozzle extending through said fitting and beyond the outer end thereof and being rotatable relative thereto, said discharge nozzle having its discharge end bent angularly to project radially beyond the wall of the tubular fitting.

17. Apparatus for removing carbon particles from a cylinder wall of an internal combustion engine as defined in claim numbered 8 characterized in that the opening through the wall is a threaded spark plug opening provided at its outer end with a surrounding counter bore and the deformable portion of the tubular end fitting which is adapted to form a seal about the cylinder wall opening is adapted to form a seat against the bottom of the counter bore about the spark plug opening.

18. Apparatus for removing carbon from the head of a cylinder of an internal combustion engine as defined in claim numbered 4 characterized in that a granule obstructing element is disposed within the chamber to deflect granules projected by the second jet and is associated with the means within the chamber which is adapted to direct the granules projected by the second jet.

19. Apparatus for removing carbon particles from the head of a cylinder of an internal combustion engine, which cylinder is provided with an opening through its wall comprising, in combination, a granule container, a granule discharge chamber, a granule delivery line leading from the chamber and terminating in a discharge nozzle receivable through the cylinder wall opening, air blast mechanism adapted to direct an air blast against the granules in the discharge chamber to project a blast of granules through the delivery line discharge nozzle and direct the same against the head of the cylinder, a granule return line leading into the granule container and provided with a tubular end fitting surrounding in spaced relation the discharge nozzle and adapted to bear against the cylinder surrounding the cylinder wall opening to form a tight seal about the opening, said tubular end fitting having a resistingly deformable substantially air impervious portion adapted to permit limited flexibility of the tubular end fitting relative to the cylinder wall opening, said discharge nozzle being supported within the tubular end fitting for rotatable movement and axial slidable movement beyond and toward the end fitting.

GEORGE M. GRAHAM.

References Cited in the file of this patent

UNITED STATES PATENTS

| Number | Name | Date |
| --- | --- | --- |
| 1,171,286 | Wadsworth | Feb. 8, 1916 |
| 1,230,654 | Berry | June 19, 1917 |
| 1,557,131 | Armstrong | Oct. 13, 1925 |
| 2,042,120 | Palmiter | May 26, 1936 |
| 2,075,732 | Lauffer | Mar. 30, 1937 |
| 2,455,514 | Mead | Dec. 7, 1948 |